(12) United States Patent
Albrecht et al.

(10) Patent No.: US 6,211,317 B1
(45) Date of Patent: Apr. 3, 2001

(54) COPOLYMERS BASED ON UNSATURATED DICARBOXYLIC ACID DERIVATIVES AND OXYALKYLENE GLYCOL ALKENYL ETHERS

(75) Inventors: Gerhard Albrecht, Tacherting (DE); Hubert Leitner, Haus/Ennstal (AT); Josef Weichmann, Pleiskirchen; Alfred Kern, Kirchweidach, both of (DE)

(73) Assignee: SWK Bauchemie GmbH, Trostberg (DE)

( * ) Notice: Subject to any disclaimer, the term of this patent is extended or adjusted under 35 U.S.C. 154(b) by 0 days.

(21) Appl. No.: 09/126,360

(22) Filed: Jul. 30, 1998

(30) Foreign Application Priority Data

Aug. 1, 1997 (DE) ............................................. 197 33 429

(51) Int. Cl.$^7$ ...................... C08F 222/04; C08F 222/40; C08F 222/02; C08F 222/20
(52) U.S. Cl. .................. 526/271; 526/240; 526/270; 526/304; 526/310; 526/318.2; 526/262
(58) Field of Search ..................................... 526/270, 332, 526/240, 262, 304, 310, 271, 318.2

(56) References Cited

U.S. PATENT DOCUMENTS

| | | | |
|---|---|---|---|
| 4,471,100 | * | 9/1984 | Tsubakimoto ......................... 525/367 |
| 5,369,198 | * | 11/1994 | Albrecht ................................ 526/240 |

FOREIGN PATENT DOCUMENTS

| | | |
|---|---|---|
| 0056627 | 7/1982 | (EP) . |
| 0606055 | 7/1994 | (EP) . |
| 0610699 | 8/1994 | (EP) . |
| 0736553 | 10/1996 | (EP) . |

* cited by examiner

*Primary Examiner*—Fred Zitomer
(74) *Attorney, Agent, or Firm*—Fulbright & Jaworski, LLP

(57) ABSTRACT

Copolymers based on unsaturated dicarboxylic acid derivatives, oxyalkylene glycol alkenyl ethers, unsaturated dicarboximides and/or -amides and vinyl monomers are described, as also their use as additives for hydraulic binders, especially cement. The copolymers also have an excellent plasticizing effect—even if they are added in large quantities—when used in concrete mixtures with an extremely low water content, and they do not retard the setting process.

18 Claims, No Drawings

COPOLYMERS BASED ON UNSATURATED DICARBOXYLIC ACID DERIVATIVES AND OXYALKYLENE GLYCOL ALKENYL ETHERS

This invention relates to copolymers based on unsaturated dicarboxylic acid derivatives and oxyalkylene glycol alkenyl ethers, methods of preparing them and use of these copolymers as additives for hydraulic binders, especially cement, to improve the properties of construction materials made therefrom, both during processing and in the hardened state.

It is known that additives in the form of dispersing agents are often mixed with aqueous slurries of powdery inorganic or organic substances such as clays, porcelain slips, silicate dust, chalk, soot, powdered stone, pigments, talcum, powdered plastics and hydraulic binders in order to improve their workability, ie, their kneadability, spreadability, sprayability, pumpability or flow characteristics. These additives, which generally contain ionic groups, are able to break up agglomerations of solids, to disperse the particles formed, and in this way to improve the workability, in particular that of highly concentrated suspensions. This effect is exploited selectively in the preparation of construction-material mixtures which contain hydraulic binders such as cement, lime, gypsum and anhydrite.

In order to obtain these construction materials based on the above-mentioned binders in a ready-to-use, workable state one normally requires a lot more mixing water than is necessary for the subsequent hydration and setting process. The air which is entrained due to the subsequent evaporation of this excess water signicantly impairs the mechanical strength and stability of the finished construction.

To reduce the amount of excess water for a given processing consistency and/or to improve the workability for a given water/binder ratio, use is made of additives which are generally referred to as water reducers or plasticizers. The best-known of these plasticizers are polycondensation products based on naphthalene or alkyl-naphthalene sulfonic acids (cf. EP-A 214 412) and sulfonated melamine formaldehyde resins (cf. DE-PS 16 71 017).

The disadvantage of these additives is that their excellent fluidizing effect only lasts for a short period of time, especially in the case of concrete construction work. The reduction in workability (slump loss) of concrete mixtures within a short period is especially problematical when, eg, due to long transport or hauling distances, a lot of time elapses between mixing and placing the concrete.

There is an additional problem when these plasticizers are used in mining or for interior applications (gypsum plasterboard drying, anhydrite flooring screeds, casting of prefabricated concrete constructions); in such cases, the toxic formaldehyde contained in the mixtures may be set free and can cause substantial pollution at the workplace. For this reason, endeavours were made to develop concrete plasticizers comprising monoesters of maleic acid and styrene, which do not contain any formaldehyde. Such plasticizers are described, eg, in the EP-A 306 449. The fluidity of concrete mixtures containing these additives can be maintained for a sufficiently long period of time; however, due to hydrolysis of the polymeric ester, the initial, very high dispersing effect of the plasticizer itself is very quickly lost if the aqueous formulation is stored.

This problem does not arise with the polymeric plasticizers described in the EP-A 610 699, which consist of copolymers with maleic acid monoester structures, maleic acid amide or imide structures, and vinyl monomers. These products have the disadvantage, however, that an undesirably high proportion of air is entrained, which reduces the strength and stability of the hardened building material. In order to obtain the optimal chain length required for the intended use of the copolymers, it is moreover essential to employ chain-transfer agents such as n- and tertiary dodecycl mercaptan or diisopropyl xanthogen disulfite. Use of these compounds for the preparation of the above-mentioned plasticizers, however, is associated with a very strong and unpleasant smell.

The problem of undesirably high air entrainment is overcome in the case of the copolymers described in the EP-A 736 553, which are based on oxyalkylene glycol alkenyl ethers and unsaturated dicarboxylic acid derivatives, by means of hydrophobic structural elements based on polydimethyl siloxane, (block) polymers containing polypropylene glycol, and/or esters of dicarboxylic acids. In addition, the use of unpleasantly-smelling chain-transfer agents is unnecessary. However, especially in applications where particularly dense and therefore very strong and very stable concrete containing as little water as possible is required, namely in the future-oriented and innovative field of high-performance concrete, polymers of this type, like those described in the EP-A 610 699, do not exhibit optimal properties.

The object of this invention was thus to provide new polymeric compounds which do not have the aforementioned disadvantages of the prior-art but which, at dosages as low as possible, maintain the workability of highly-concentrated construction material mixtures for a suitable period of time, without retarding the setting process and without causing excessive entrainment of air, and which do not necessitate the use of unpleasantly-smelling products during their preparation.

This object was established by means of copolymers as described in claim 1. Surprisingly, it was found that the products of the invention, which are based on unsaturated dicarboxylic acid derivatives and oxyalkylene glycol alkenyl ethers, impart excellent processing characteristics to aqueous construction material mixtures, without impairing the properties of the construction material in its hardened state.

What was especially surprising was the fact that the copolymers of the invention also display an excellent plasticizing effect in concrete mixtures with extremely low proportions of water, and even when added in larger quantities do not retard setting.

The copolymers of the invention are made up of at least four structural units, a), b), c) and d).

The first structural unit a) is a dicarboxylic acid derivative with the formula Ia) and/or Ib),

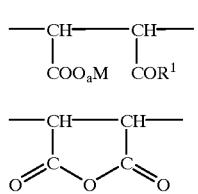

where a, M and $R^1$ mean the following:

M stands, in each case independently, for hydrogen, a mono- or bivalent metal cation, an ammonium ion or an organic amine residue, such organic amine residues preferably being substituted ammonium groups derived from primary, secondary or tertiary $C_1$ to $C_{20}$ alkylamines, $C_1$ to $C_{20}$ alkanolamines, $C_5$ to $C_8$ cycloalkylamines and $C_8$ to $C_{14}$ arylamines. Examples of such amines are methylamine, dimethylamine, trimethylamine, ethanolamine, diethanolamine, triethanolamine, methyl diethanolamine, cyclohexylamine, dicyclohexylamine, phenylamine and diphenylamine in the protonated (ammonium) form.

$a=\frac{1}{2}$ or 1 depending on whether M is a mono- or bivalent cation.

$R^1$ can stand for $O_aM$, but preferably stands for $—O—(C_mH_{2m}O)_n—R^2$, where $R_2$ can be H, an aliphatic hydrocarbon residue with 1 to 20 C atoms, a cycloaliphatic hydrocarbon residue with 5 to 8 carbon atoms or an aryl residue, which may be substituted, with 6 to 14 C atoms, and m can be 2 to 4 and n 1 to 200. The aliphatic hydrocarbons can be linear or branched, saturated or unsaturated. Preferred cycloalkyl residues are cyclopentyl and cyclohexyl residues, and preferred aryl residues are phenyl or naphthyl residues which may be substituted with $C_1$–$C_4$ alkyl residues and, especially, with hydroxyl, carboxyl and/or sulfonic acid groups.

Instead of, or in addition to the dicarboxylic acid derivative represented by formula Ia, the structural unit Ia) (dicarboxylic acid derivative) can be present in cyclic form, as represented by formula Ib.

The second structural unit b) corresponds to formula II,

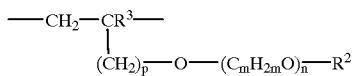

II and derives from oxyalkylene glycol alkenyl ethers, in which m, n and $R^2$ have the aforementioned meanings. $R^3$ stands for hydrogen or an aliphatic hydrocarbon residue with 1 to 5 C atoms, which again may be linear or branched and also unsaturated. p can assume values between 0 and 3.

In the preferred embodiments, m is 2 and/or 3 in formulae Ia and II, which means that these groups are polyalkylene oxide groups which derive from polyethylene oxide and/or polypropylene oxide. In another preferred embodiment, p is 0 or 1 in formula II, which makes for vinyl and/or allyl polyalkoxylates.

The third structural unit is represented by formula IIIa and/or IIIb,

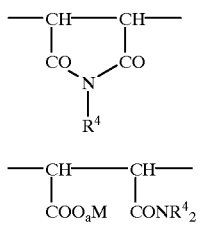

IIIa

IIIb where a and M have the aforementioned meanings and $R^4$, in each case independently, stands for hydrogen, an aliphatic hydrocarbon residue which may be substituted with hydroxyl groups and which has 1 to 20 C atoms, a cycloaliphatic hydrocarbon residue with 5 to 8 C atoms or an aryl residue with 6 to 14 C atoms, in which one or more H atoms can be substituted, eg, with the structural elements $—COO_aM_1$, $—(SO_3)_aM$ and/or $—(PO_3)_aM_2$, where a and M have the aforementioned meanings. $R^4$ can also stand for the residues $—(C_mH_{2m}O)_n—R^2$ and $—CO—NH—R^2$, with the aforementioned meanings for m, n and $R^2$.

The fourth structural unit d) is represented by formula IV,

IV

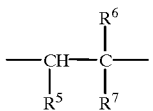

where $R^5$, in each case independently, is a methyl or methylene group, which may be substituted and which, together with $R^7$, forms one or more 5- to 8-membered rings (for example, an indene ring), $R^6$ is hydrogen or a methyl or ethyl group, and $R^7$, in each case independently, is hydrogen, a $C_1$ to $C_{20}$ alkyl, a $C_5$ to $C_8$ cycloalkyl, or a $C_6$ to $C_{14}$ aryl residue, which may be substituted. In addition, $R^7$ can stand for the groups $—O—COR^4$, $—OR^4$, or $—COOR^4$, where $R^4$ has the aforementioned meaning.

It must be seen as essential to the invention that the copolymers contain 1.0 to 90 mol. % of structural units with the formula Ia and/or Ib, 0.5 to 80 mol. % of structural units with the formula II, 0.5 to 80 mol. % of structural units with the formula IIIa and/or IIIb, and 1.0 to 90 mol. % of structural units with the formula IV.

It is to advantage if these copolymers consist of 30 to 60 mol. % of structural units with the formula Ia and/or Ib, 10 to 40 mol. % of structural units with the formula II, 3 to 30 mol. % of structural units with the formula IIIa and/or IIIb, and 10 to 60 mol. % of structural units with the formula IV. It is especially preferable if, in the copolymers of the invention, the molar ratio of structural units (I+III):(II+IV) is approximately 1:1.

According to a preferred embodiment, the copolymers of the invention also contain up to 50 mol. %, preferably up to 20 mol. %—expressed in terms of the sum of structural units I to IV—of structural units based on N-vinyl compounds, vinyl or allyl sulfonic acids, and acrylamides or methacrylamides which may be substituted.

Each of the structural units I to IV can be of uniform composition, but they can also be present as a mixture of different substances. For example, in substituent $R^1$ of formula Ia and in formula II, n can assume different values in one and the same copolymer; in a particularly preferred embodiment, this results in long and short alkylene oxide sequences alternating with each other, which can influence the properties of the copolymers very positively in terms of their practical application.

The number of repetitive structural elements a) to d) in the copolymers of the invention is not limited, but it has proved beneficial to adjust this number such that the copolymers have an average molecular weight of 1,000 to 200,000, the desired chain length depending primarily on the nature of the inorganic binder (Portland cement, anhydrite, gypsum, etc.) and the field of application (fluid concrete, anhydrite screed, etc.).

The copolymers of the invention can be produced in different ways. What is essential is to polymerize 1 to 90 mol. % of an unsaturated dicarboxylic acid derivative, 0.5 to 80 mol. % of an oxyalkylene glycol alkenyl ether, 0.5 to 80 mol. % of an unsaturated dicarboximide or -amide and 1.9 to 90 mol. % of a vinyl monomer, preferably with the help of a free-radical initiator.

It is possible to use the monomers which form the structural units Ia, IIIa and IIIb in the preformed state; alternatively, these structural units may be formed during and/or after polymerization from precursor Ib by way of polymer-analogous reactions. The structural units II and IV, by contrast, are generally produced from the corresponding preformed monomers during the polymerization process.

As unsaturated dicarboxylic acid derivative which leads to structural units of formula Ia, use is made preferably of maleic acid, fumaric acid, mono- or bivalent metal salts of these dicarboxylic acids, such as sodium, potassium, calcium or magnesium salt, ammonium salts or salts with an organic amine residue. As monomers for forming unit Ia, it is of advantage to use polyalkylene glycol monoesters of the above-mentioned acids, which have the general formula V, $$M_aOOC-CH=CH-COO-(C_mH_{2m}O)_n-R^2 \quad \text{V}$$

where a, m, n and $R^2$ have the meanings already explained. The structural unit Ib derives from maleic anhydride. The unsaturated dicarboxylic acid derivatives which lead to the structural units of formula Ia and Ib are preferably used in a quantity of 30 to 60 mol. %.

The second essential component, for incorporating structural unit b) in the copolymers of the invention, is an oxyalkylene glycol alkenyl ether, which is preferably used in a quantity of 10 to 40 mol. %. In the preferred oxyalkylene glycol alkenyl ethers of formula VI, $$CH_2=CR^3-(CH_2)_p-O-(C_mH_{2m}O)_n-R^2 \quad \text{VI}$$

p, m, n, $R^2$ and $R^3$ have the meanings already explained. To control the chain length, it has proved especially beneficial here to use methylpolyethylene glycol monovinyl and allyl ethers (p=0 or 1, m=2).

As third essential component, for incorporating structural unit c) in the copolymer, use is made preferably of 3 to 30 mol. % of an unsaturated dicarboximide and/or -amide. According to the invention, structural unit III can be in the form of a 5-member, preferably substituted cyclic imide (IIIa) or of an open-chain dicarboxylic monoamide of a primary and/or secondary amine (IIIb). This structure may already be predetermined by the nature of the corresponding monomers of formula VII,

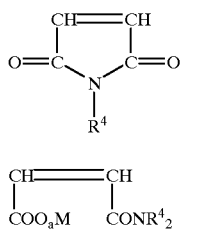

where a, M and $R^4$ have the meanings already explained.

Examples of such monomers are N-phenyl maleimide, N-(2,6-dimethylphenyl) -maleimide, N-hydroxyethyl maleimide, N-(4-sulfophenyl)-maleimide (VIIa), N-phenyl maleic monoamide, N-(4-sulfophenyl) maleic monoamide, N-(3,6-disulfonaphthyl-1)-maleicmonoamide and N,N-(dimethoxyethyl)-maleicmonoamide (VIIb).

The structures corresponding to IIa and/or IIIb and to VIIa and/or VIIb may also be formed, however in the course of the polymerization process; compounds of formula IIIa or VIIa are formed, eg, by reaction of compounds carrying primary amino groups with an anhydride group of formula Ib. If secondary amines are used in this "in situ" process, the reaction usually stops at the monoamide stage corresponding to structure IIIb or VIIb; in many cases, this is desirable. Examples of such primary and secondary amines include: n-butylamine, 2-ethylhexylamine, n-laurylamine, glutamic acid, glycine, sulfanilic acid, taurine, phosphanilic acid, 1-amino-3,6-naphthalenedisulfonic acid, cyclohexylamine, dibutylamine and bis-(2-methoxyethyl)-amine.

As fourth essential component, for incorporating structural unit d) into the copolymer, use is made preferably of such monomers as have a high tendency to copolymerize with electron-deficient acceptor monomers such as maleic anhydride. Examples of such monomers include ethylene, propylene, n-butylene, isobutene, diisobutene, cyclohexene, styrene, α-methylstyrene, indene, 4-methoxystyrene, 4-methylstyrene, vinyl acetate, vinyl propionate, methyl vinyl ether, ethyl vinyl ether and dicyclopentadiene.

In addition, it is also possible to use methyl methacrylate, ethyl acrylate, hydroxyethyl methacrylate, butyl acrylate, acrylic acid, methacrylic acid and monomers of the general formula VIII, $$R^5CH=CR^6R^7 \quad \text{VIII}$$

where $R^5, R^6$ and $R^7$ can have the meanings explained under IV. The monomers of structure VIII may also be used in the form of a mixture.

For synthesizing the copolymers of the invention, a preferred embodiment provides for the additional use of up to 50 mol. %, in particular up to 20 mol. %—expressed in terms of the monomers of formulae I to IV or V to VIII—of other polymerizable monomers, eg, monomers based on N-vinyl compounds, vinyl or allyl sulfonic acids and may be substituted acryl- or methacrylamides. Examples of such compounds include N-vinylpyrrolidone, allyl sulfonic acid, methallyl sulfonic acid, vinyl sulfonic acid and 2-acrylamido-2-methylpropane sulfonic acid.

The copolymers of the invention can be prepared using customary methods. A particular advantage of the invention is that one can work without a solvent, or with an aqueous solution. In both cases the reactions proceed at normal pressures and accordingly do not pose a safety risk.

If the process is carried out in aqueous solution, polymerization takes place at 20 to 100° C. with the help of a free-radical initiator. The concentration of the aqueous solution is preferably adjusted to 20 to 50 wt. %. According to a preferred embodiment, the free-radical polymerization can be conducted in the acidic pH range, especially at a pH between 4.0 and 6.5; use can be made of conventional initiators such as $H_2O_2$ without any risk of ether being split off, which would strongly reduce the yield.

According to the method of the invention, it is of advantage to start with the unsaturated dicarboxylic acid derivative and to add the other monomers and the initiator when the necessary reaction temperature has been reached.

The polymerization aids are added separately. They serve to lower the activation threshold of the initiator—preferably a peroxide—so that copolymerization takes place at a relatively low temperature.

If the unsaturated dicarboxylic acid derivatives are used in form of the preferred polyalkylene glycol monoesters of the general formula V, it is also possible according to the invention to first prepare them as an intermediary in the starting mixture by reacting the unsaturated dicarboxylic acid with the polyalkylene oxides. It is likewise possible to prepare the dicarboximides and/or—amides, which have the general formula IIIb and/or VIIb and are required for incorporation of the structural unit c), separately as intermediates, and to add them—possibly together with the other monomers—to the unsaturated dicarboxylic acid derivative.

The nature of the polymerization initiators, activators, and other aids, such as chain-transfer agents, is relatively unproblematical; as initiators, the usual radical donors can be used, such as hydrogen peroxide, sodium, potassium or ammonium peroxodisulfate, tertiary butylhydroperoxide, dibenzoyl peroxide, lauroyl peroxide, dicyclohexyl peroxodicarbonate, tertiary butylperoxy-2-ethyl-hexanoate, tertiary butyl perbenzoate, sodium peroxide, 2,2'-azobis-(2-amidinopropane)-dihydrochloride, azobis-(isobutyronitrile), azobis-(2-methylvaleronitrile), azobis-(cyclohexanecarbonitrile), etc. If redox systems are used, the above-mentioned initiators are combined with reducing activators. Examples of such reduction agents include Fe (II) salts, sodium hydroxymethanesulfinate dihydrates, alkali metal sulfites and metabisulfites, sodium hypophosphite, hydroxylamine hydrochloride and thiourea.

As polymerization accelerators or activators, use is made of sodium bisulfite, ascorbic acid or salts of heavy metals, and as chain-transfer agents, of sulfur-less compounds such as allyl compounds, aldehydes and phosphorus-containing components.

A special advantage of the copolymers of the invention is the fact that they can also be prepared without a solvent; this can be effected with the help of the customary free-radical initiators at temperatures between 60 and 150° C. This variant is an economical alternative, especially when the copolymers of the invention are to be used directly in anhydrous form for the application claimed in the invention; in such cases, the time-consuming removal of solvent, especially of water, for example by means of spray drying, is rendered unnecessary.

According to a preferred embodiment, the copolymers of the invention are diluted with water following polymerization, and neutralized by addition of a basic compound.

The copolymers of the invention are an ideal additive for aqueous solutions, especially solutions based on inorganic binders such as cement, lime, gypsum, hemihydrate and anhydrite. They are added in a quantity of 0.01 to 10 wt. %, preferably 0.05 to 3 wt. %, expressed in terms of the inorganic binder. The copolymers have an excellent and long-lasting plasticizing effect, without causing undue entrainment of air into the binder mixture and without impairing the strength or stability of the construction material in the hardened state. The copolymers of the invention are especially suitable for suspensions with a low water content, for example suspensions with a water content of 15 to 45 wt. %, expressed in terms of the proportion of inorganic binder.

The following examples serve to explain the invention in more detail.

EXAMPLE 1

763.3 g (0.413 mol) methylpolyethylene glycol (MW 1 850 g/mol) was introduced into a 2 500 ml double-walled reaction vessel equipped with thermometer, stirrer, reflux condenser and two inlets for separate feeds, and mixed with 9.8 g (0.100 mol) maleic anhydride by stirring. The air trapped in the vessel was flushed out by passing nitrogen through for 30 minutes, and the contents of the flask were heated to 105° C.

At the same time, a mixture of 763.3 g (0.413 mol) methylpolyethylene glycol (MW 1 850 g/mol), 69.8 g (0.279 mol) methylpolyethylene glycol monoallyl ether (MW 250 g/mol) and 38.1 g (0.165 mol) sodium salt dihydrate of sulfanilic acid was prepared in a separate feed vessel (feed 1) equipped with heating and stirring means. At a temperature of 65° C., 203.9 g (2.079 mol) maleic anhydride was added, while stirring, to the mixture (formation of monomer component VIIb). After flushing with nitrogen, this mixture, together with a second mixture consisting of 287.2 g (2.758 mol) styrene, 12.2 g azobis-(isobutyronitrile) and 2.5 g 1,1'azobis-(cyclohexanecarbonitrile) (feed 2) was added continuously to the reaction vessel over a period of 60 minutes. On completion of the addition, the reaction mixture was heated to 115° C. and stirred for another 60 minutes. To complete esterification and imide formation, the reaction temperature was then raised to 140° C. and the mixture stirred for another 120 minutes.

The clear, orange polymer melt was cooled to 115° C. with continued stirring, mixed with 63 g diisobutyl phthalate, cooled further to 50° C., diluted with 2500 ml water and adjusted to a pH of 6.5 with dilute sodium hydroxide solution.

A cloudy, yellowy-orange solution was obtained, which had a solids content of 34.7 wt. %.

Example 2

A procedure analogous to that of Example 1 was used, but with the following compositions for feeds 1 and 2:

| Feed 1: | |
|---|---|
| 763.3 g (0.413 mol) | methylpolyethylene glycol (MW 1 850 g/mol) |
| 31.2 g (0.125 mol) | methylpolyethylene glycol monoallyl ether (MW 250 g/mol) |
| 28.6 g (0.165 mol) | N-phenyl maleimide |
| 212.0 g (2.162 mol) | maleic anhydride |

Feed 2:
290.3 g (2.787 mol) styrene
12.2 g azobis-(isobutyronitrile)
2.5 g azobis-(cyclohexanecarbonitrile)

63 g disobutyl phthalate was added to the reddish-brown polymer melt, which was then diluted and neutralized.

A cloudy, yellowish formulation was obtained, which had a solids content of 34.3 wt. %.

Example 3

The procedure of Example 1 was repeated, except that 97.7 g (0.279 mol) methylpolyethylene glycol monovinyl ether (MW 350 g/mol) was used instead of the allyl ether (MW 250 g/mol) used in Example 1. In addition, the vinyl ether, mixed with styrene, was added to the reaction vessel via feed 2, and not via feed 1 like the allyl ether in Example 1. During the cooling phase, the dark brown polymer had 64 g diisobutyl phthalate added to it before it was diluted with water and neutralized with NaOH.

The cloudy, brownish end product had a solids content of 33.8 wt. %.

Example 4

1 318.1 g (0.7125 mol) methylpolyethylene glycol (MW 1 850 g/mol) and 118.8 g (0.2376 mol) methylpolyethylene glycol (MW 500 g/mol) was introduced into the reaction vessel and mixed with 219.9 g (2.243 mol) maleic anhydride. After flushing for 30 minutes with nitrogen, the flask contents were heated to 105° C. and, from a separate feed, a mixture of

| | |
|---|---|
| 223.8 g (2.149 mol) | styrene |
| 179.1 g (0.716 mol) | methylpolyethylene glycol monoallyl ether (MW 250 g/mol) |

| 13.1 g | azobis-(isobutyronitrile) and |
| 2.7 g | azobis-(cyclohexanecarbonitrile) | was added over a period of 2 hours. On completion of the addition, the temperature was raised to 115° C., and the mixture was stirred for another 60 minutes at this temperature in order to complete the polymerization reaction. A mixture of 35.9 g (0.270 mol) di-(2-methoxyethyl)amine and 63.3 g diisobutyl phthalate was then added over a period of 30 minutes, and the temperature raised to 140° C. After reaching this temperature, the contents of the flask were stirred for another 2 hours to complete esterification and monoamide formation. After being cooled to 50° C., the product was diluted with water and adjusted to a pH of 6.5 with dilute sodium hydroxide solution.

An amber-colored emulsion was obtained, with a solids content of 34.9 wt. %.

Example 5

The procedure of Example 4 was repeated with 160.2 g (0.237 mol) of a block copolymer of ethylene oxide and propylene oxide (molar proportion 10:3, MW 675 g/mol), which carried a methyl ether at one end and was used instead of the methylpolyethylene glycol (MW 500 g/mol) of Example 4.

An emulsion was obtained which had a solids content of 36 wt. %.

Example 6

The procedure of Example 4, except that the quantity of styrene was reduced to 150.4 g (1.444 mol) in favour of an additional 78.4 g (0.705 mol) N-vinylpyrrolidone.

The pale brown end product had a solids content of 34.1 wt. %.

Example 7

800 g (0.800 mol) methylpolyethylene glycol monovinyl ether (MW 1 000 g/mol)
100 g (0.200 mol) methylpolyethylene glycol (MW 500 g/mol), and
257.4 g (2.625 mol) maleic anhydride
were introduced into the reaction vessel, which was flushed with nitrogen and heated to 95° C. Then a mixture of

| 26 g (0.250 mol) | styrene |
| 950 g (0.950 mol) | methylpolyethylene glycol monovinyl ether (MW 1 000 g/mol), and |
| 21 g | azobis-(2-methylbutyronitrile) |

21 g azobis-(2-methylbutyronitrile)
was added over a period of 2 hours. On completion of the addition, the reaction mixture was stirred for a further 2 hours at 95° C.

Subsequently,
56.4 g (0.423 mol) di-(2-methoxyethyl)amine and
65 g diisobutylphthalate
were added and the temperature raised to 125° C. The mixture was stirred at this temperature for another two hours, and then cooled to 50° C. prior to dilution and neutralization.

A pale brown formulation was obtained, which had a solids content of 39.9 wt. %.

Example 8

The procedure of Example 7, except that 880 g (0.800 mol) methylpolyethylene glycol monoallyl ether (MW 1 100 g/mol) was used instead of vinyl ether as starting product, and 1 045 g (0.950 mol) methylpolyethylene glycol monoallyl ether (MW 1 100 g/mol) instead of the vinyl ether in the feed. The quantity of initator had to be increased to 43.5 g.

A pale brown product was obtained, which had a solids content of 43.2 wt. %.

Example 9

A polymer was synthesized using the procedure of Example 4, except that in the secondary reaction, 37.7 g (0.380 mol) cyclohexylamine was used instead of di-(2-methoxyethyl)amine.

The reddish-brown end product had a solids content of 36.1 wt. %.

Example 10

Instead of the di-(2-methoxyethyl)amine used in Example 4, 91.0 g (0.182 mol) methylpolyethylene glycol monoamine (MW 500 g/mol) was used to effect polymer-analogous imide formation.

The pale orange aqueous end product had a solids content of 35.0 wt. %.

Comparative Example 1

Commercial concrete plasticizer "Melment L 10" based on a sulfonated melamine formaldehyde polycondensate.

Comparative Example 2

Commercially available plasticizer "Liquiment N" based on a sulfonated naphthalene formaldehyde polycondensate.

Comparative Example 3

A copolymer was synthesized from methylpolyethylene glycol monomaleate and styrene according to the method described in the EP-A 306 449.

Comparative Example 4

As described in the EP-A 610 699, a copolymer was prepared from methylpolyethylene glycol (MW 500 g/mol), maleic anhydride which had been partially reacted with cyclohexylamine in a polymer-analogous reaction, and styrene.

Comparative Example 5

A copolymer of maleic anhydride, methylpolyethylene glycol monovinyl ether (MW 500 g/mol) and polypropylene glycol-bis(maleamide) according to EP-A 736 553, Example 1.

To demonstrate the superior qualities of the copolymers of the invention compared to known products, the aqueous copolymer formulations were subjected to a comparative test as plasticizers for cementitious solids suspensions (mortar, concrete).
Sample Application 1

450 g of Portland cement (CEM 1 42.5 R, Mannersdorf) were mixed according to standard procedure with 1 350 g of cement-testing sand (coarse: fine=2:1) and 225 g of water which contained the products of the invention or the comparative products in dissolved form. Slump was determined immediately after the cement mortar had been prepared, as also the slump loss with time over a period of 90 minutes. In addition, at the start of the series of measurements, the entrained air was determined.

The results of these tests are contained in Table 1.

TABLE 1

Results of the cement mortar tests (water-cement ratio (w/c) = 0.50)

| Additive | Dosage (wt. %)[1] | Slump in cm after | | | | | | | Air (vol. %) |
|---|---|---|---|---|---|---|---|---|---|
| | | 0 min | 15 min | 30 min | 45 min | 60 min | 75 min | 90 min | |
| Ex. 1 | 0.25 | 26.0 | 25.0 | 24.4 | 23.9 | 22.8 | 21.6 | 20.3 | 2.7 |
| Ex. 2 | 0.25 | 27.4 | 26.9 | 26.0 | 25.0 | 23.8 | 22.0 | 19.9 | 2.3 |
| Ex. 3 | 0.25 | 26.7 | 25.7 | 24.9 | 24.0 | 23.5 | 22.8 | 21.9 | 4.0 |
| Ex. 4 | 0.25 | 27.3 | 26.6 | 25.7 | 25.1 | 24.1 | 23.0 | 21.7 | 2.3 |
| Ex. 5 | 0.25 | 25.9 | 25.0 | 24.6 | 24.0 | 23.6 | 22.6 | 20.9 | 2.0 |
| Ex. 6 | 0.25 | 27.8 | 26.5 | 26.0 | 25.3 | 24.7 | 23.8 | 22.9 | 2.4 |
| Ex. 7 | 0.25 | 25.3 | 26.0 | 26.0 | 25.3 | 24.6 | 23.9 | 23.0 | 5.0 |
| Ex. 8 | 0.25 | 27.0 | 26.4 | 25.7 | 24.9 | 23.9 | 23.0 | 22.0 | 3.2 |
| Ex. 9 | 0.25 | 25.1 | 24.0 | 23.1 | 22.3 | 21.5 | 20.5 | 19.7 | 4.3 |
| Ex. 10 | 0.25 | 26.9 | 26.8 | 26.0 | 25.1 | 24.0 | 23.2 | 22.0 | 4.4 |
| Comp. 1 | 0.50 | 19.9 | 17.4 | 14.6 | — | — | — | — | 2.0 |
| Comp. 2 | 0.50 | 20.7 | 18.3 | 16.0 | 15.0 | — | — | — | 3.1 |
| Comp. 3 | 0.25 | 19.8 | 19.0 | 18.1 | 17.4 | 16.3 | 15.3 | — | 4.0 |
| Comp. 4 | 0.25 | 22.1 | 20.4 | 19.7 | 18.6 | 18.0 | 16.7 | 15.7 | 8.6 |

[1]Solid polymer expressed in terms of cement weight

Sample application 2

Using the standard procedure, 5.3 kg Portland cement (CEM I 42.5 R, Kiefersfelden) were mixed in a compulsory concrete mixer with 33.0 kg of construction aggregates (grain-size distribution 0 to 32 mm) and 2.65 kg of water (without the water containing the plasticizer). The aqueous solutions containing the copolymers of the invention or the comparative products were added, and the slump determined as per German standard DIN 1048 (double determination) 10 and 40 minutes after addition of the plasticizer.

Following the 10-minute slump measurement, the freshly mixed concrete was poured into a mold, compacted for 10 s and then stored for 24 h at 20° C. The compression strength of the resulting test objects (edge length 15×15× 15 cm) was determined, as also, by way of the density, the amount of entrained air.

The results are contained in Table 2.

TABLE 2

Concrete tests for a water/cement ratio of 0.50

| Additive | Dosage (wt. %)[1] | Slump in cm after | | Air content (vol. %) | 24 h compr. strength in MPa |
|---|---|---|---|---|---|
| | | 10 min | 40 min | | |
| Ex. 1 | 0.20 | 56.25 | 48.50 | 2.1 | 19.40 |
| Ex. 2 | 0.20 | 57.50 | 50.50 | 2.3 | 16.30 |
| Ex. 3 | 0.20 | 59.00 | 51.00 | 1.7 | 13.44 |
| Ex. 4 | 0.20 | 59.50 | 49.00 | 2.0 | 13.16 |
| Ex. 5 | 0.20 | 58.75 | 50.25 | 1.4 | 14.01 |
| Ex. 6 | 0.20 | 60.75 | 51.75 | 1.8 | 14.93 |
| Ex. 7 | 0.20 | 59.00 | 52.00 | 3.0 | 10.50 |
| Ex. 8 | 0.20 | 61.00 | 50.25 | 2.4 | 11.49 |
| Ex. 9 | 0.20 | 56.25 | 48.75 | 2.9 | 14.98 |
| Ex. 10 | 0.20 | 56.75 | 53.75 | 2.6 | 17.52 |
| Comp. 1 | 0.46 | 54.50 | 45.25 | 1.7 | 16.80 |
| Comp. 2 | 0.40 | 55.00 | 46.00 | 2.3 | 13.98 |
| Comp. 3 | 0.20 | 53.25 | 44.25 | 2.5 | 15.33 |
| Comp. 4 | 0.20 | 56.00 | 47.50 | 2.8[2] | 12.94 |

[1]Solid polymer expressed in terms of cement weight
[2]Defoamed with 1.2 wt. % tributyl phosphate In addition to the concrete tests carried out on the products of the invention and on the comparative products for a water/cement ratio of 0.50 (Table 2), tests were performed on concrete containing substantially less water (0.40). High-strength concretes of especially dense structure are produced using this 30 low w/c ratio.

Sample application 3

The test was carried out in the same way as for sample application 2, but with 2.12 kg of water instead of 2.65 kg. The results are contained in Table 3.

TABLE 3

| Additive | Dosage (wt. %)[1] | Slump in cm after | | Air content (vol. %) | 24 h compr. strength in MPa |
|---|---|---|---|---|---|
| | | 10 min | 40 min | | |
| Ex. 1 | 0.40 | 58.75 | 49.00 | 1.7 | 20.20 |
| Ex. 2 | 0.40 | 61.00 | 54.00 | 1.8 | 17.00 |
| Ex. 3 | 0.40 | 59.25 | 53.25 | 1.3 | 16.57 |
| Ex. 4 | 0.40 | 60.00 | 51.75 | 2.0 | 12.76 |
| Ex. 5 | 0.40 | 58.00 | 52.00 | 1.9 | 13.98 |
| Ex. 6 | 0.40 | 62.25 | 54.75 | 1.6 | 17.23 |
| Ex. 7 | 0.40 | 55.75 | 48.75 | 2.7 | 12.91 |
| Ex. 8 | 0.40 | 59.50 | 49.00 | 2.0 | 13.44 |
| Ex. 9 | 0.40 | 56.00 | 50.00 | 2.7 | 17.33 |
| Ex. 10 | 0.40 | 59.75 | 54.00 | 2.1 | 19.18 |
| Comp. 1 | 1.20 | 48.00 | <35.00 | 1.6 | 18.81 |
| Comp. 2 | 1.00 | 53.75 | 47.50 | 2.2 | 16.09 |
| Comp. 3 | 0.40 | 40.75 | <35.00 | 2.4 | 5.98 |
| Comp. 4 | 0.40 | 43.00 | <35.00 | 3.9[2] | 3.91 |
| Comp. 5 | 0.40 | 46.50 | <35.00 | 1.9 | 0.11 |

[1]Solid polymer expressed in terms of cement weight
[2]Defoamed with 0.9 wt. % tributyl phosphate

What is claimed is:

1. A copolymer based on unsaturated dicarboxylic acid derivatives and oxyalkylene glycol alkenyl ethers comprising:

a. 1 to 90 mol. % of at least one member selected from the group consisting of structural units of Formula Ia and Formula Ib:

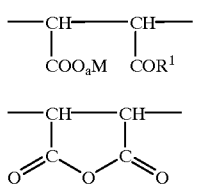

wherein M is independently H, a monovalent cation; a bivalent cation, and ammonium ion or an organic amine;

a=½ or 1;

$R^1$ is independently —$O_aM$ or —O—$(C_mH_{2m}O)_n$—$R^2$, wherein $R^2$ is selected from the group consisting of H, a $C_1$ to $C_{20}$ aliphatic hydrocarbon, a $C_5$ to $C_8$ cycloaliphatic hydrocarbon, substituted $C_6$ to $C_{14}$ aryl, and unsubstituted $C_6$ to $C_{14}$ aryl; wherein m is 2 to 4 and n is 1–200;

b. 0.5 to 80 mol. % of the structural units of Formula II

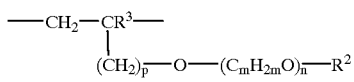

wherein $R^3$ is independently H, a $C_1$ to $C_5$ aliphatic hydrocarbon; p is 0 to 3 and $R^2$, m and n are defined as above;

c. 0.5 to 80 mol. % of structural units selected from the group consisting of Formula IIIa and IIIb

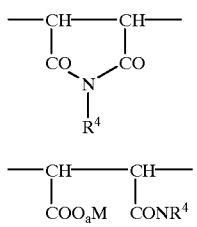

wherein $R^4$ is independently selected from the group consisting of H, a $C_1$ to $C_{20}$ aliphatic hydrocarbon that may be substituted with at least one hydroxyl group, a $C_5$ to $C_8$ cycloaliphatic hydrocarbon, and a $C_6$ to $C_{14}$ aryl which may optionally be substituted with a member selected from the group consisting of —$COO_aM$, —$(SO_3)_aM$, —$(PO_3)_aM_2$; —$(C_mH_{2m}O)_n$—$R^2$, and —CO—NH—$R^1$; wherein M, a, $R^2$, m and n are defined as above; and d. 1.0 to 90 mol. % of structural units of Formula IV

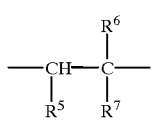

wherein $R^5$ is independently H, methyl or a possibly substituted methylene group, which, together with $R^7$ forms one or more 5- to 8-membered rings;

$R^6$ is independently H, methyl or ethyl; and $R^7$ is independently H, a $C_1$ to $C_{20}$ aliphatic hydrocarbon, a $C_5$ to $C_8$ cycloaliphatic hydrocarbon, a $C_6$ to $C_{14}$ aryl which may be substituted; —$OCOR^4$, —$OR^4$, —$OOR^4$, wherein $R^4$ is defined as above.

2. The copolymer of claim 1, wherein said copolymer contains 30 to 60 mol. % of at least on of Formula Ia and Formula Ib; 10 to 40 mol. % of structural units of formula II; 3 to 30 mol. % of at least one of structural units of Formula IIa and Formula IIIb; and 10 to 60 mol. % structural units of Formula IV.

3. The copolymer of claim 1, wherein the molar ratio of structural units (1+111) to (11+IV) is approximately 1:1.

4. The copolymer of claim 1, wherein M is a mono- or bivalent metal cation selected from the group consisting of sodium, potassium, calcium and magnesium ions.

5. The copolymer of claim 1, wherein $R^2$ is a phenyl residue which is substituted with hydroxy, carboxy- and/or sulfonic groups.

6. The copolymer of claim 1, wherein in formula II, p is 0 or 1 and m is 2 or 3.

7. The copolymer of claim 1, wherein said copolymers contain up to 50 mol. % expressed in terms of the sum of structural units with the formulae Ia, Ib, II, IIIa, IIIb and IV of additional structural units the monomers of which are N-vinyl compounds, vinyl or allyl sulfonic acids, and acryl- or methacrylamides which may be substituted.

8. The copolymers of claim 1, wherein they have an average molecular weight of 1,000 to 200,000.

9. A method of preparing the copolymer of claim 1, wherein 1 to 90 mol. % of an unsaturated dicarboxylic acid derivative, 0.5 to 80 mol. % of an oxyalkylene glycol alkenyl ether, 0.5 to 80 mol. % of an unsaturated dicarboximide and/or -amide and 1.0 to 90 mol. % of a vinyl monomer are polymerized with the help of a free-radical initiator.

10. The method of claim 9, wherein 30 to 60 mol. % of an unsaturated dicarboxylic acid derivative, 10 to 40 mol. % of an oxyalkylene glycol alkenyl ether, 3 to 30 mol. % of an unsaturated dicarboximide and/or—amide and 10 to 60 mol. % of a vinyl monomer are used.

11. The method of claim 9, wherein in addition, up to 50 mol. % expressed in terms of the monomers with the structural units of formulae I, II, IIIa, IIIb and 1V—of an N-vinyl compound, a vinyl or allyl sulfonic acid, or an acryl- or methacrylamide are copolymerized.

12. The method of claim 9, wherein the polymerization is carried out in aqueous solution at a temperature of 20 to 100° C.

13. The method of claim 12, wherein the concentration of monomers in aqueous solution is 20 to 50 wt. %.

14. The method of claim 13, wherein polymerization is carried out without a solvent in the presence of a free-radical initiator at a temperature of 20 to 150° C.

15. An aqueous suspension comprising the copolymer of claim 1 and at least one inorganic binder selected from the group consisting of cement, lime, gypsum, hemihydrate and anhydrite.

16. The aqueous suspension of claim 15, wherein said copolymer comprises 0.01 to 10 wt. % based on the weight of the inorganic binder.

17. The aqueous suspension of claim 16, wherein said copolymer comprises 0.1 to 5 wt. % based on the weight of the inorganic binder.

18. The aqueous suspension of claim 15, having a water content of 14 to 45 wt. % expressed in terms of the binder content.

* * * * *

UNITED STATES PATENT AND TRADEMARK OFFICE
CERTIFICATE OF CORRECTION

PATENT NO. : 6,211,317 B1
DATED : April 3, 2001
INVENTOR(S) : Albrecht, et al.

It is certified that error appears in the above-identified patent and that said Letters Patent is hereby corrected as shown below:

Column 1,
Line 5, insert -- Specification --.

Column 5,
Line 55, change "IIa" to -- IIIa --.

Column 9,
Line 55, delete -- 21 g azobis-(2-methylbutyronitrile) --.

Column 12,
Line 4, delete -- 30 --.

Signed and Sealed this

Twenty-seventh Day of November, 2001

Attest:

NICHOLAS P. GODICI
Attesting Officer   Acting Director of the United States Patent and Trademark Office